United States Patent [19]

Yoshikawa

[11] 4,023,181

[45] May 10, 1977

[54] RECORDING MEDIUM CONDUCTIVE ELECTRODE

[75] Inventor: Akira Yoshikawa, Ebina, Japan

[73] Assignee: Fuji Xerox Co., Ltd., Tokyo, Japan

[22] Filed: Aug. 1, 1975

[21] Appl. No.: 601,197

[30] Foreign Application Priority Data

Aug. 2, 1974  Japan ................... 49-91720[U]

[52] U.S. Cl. .......................... 346/165; 427/121; 428/195; 428/199; 428/209; 428/211; 428/913
[51] Int. Cl.² .................................. G01D 15/34
[58] Field of Search ......... 428/195, 199, 209, 211, 428/913; 427/121; 346/74 SB, 74 E

[56] References Cited

UNITED STATES PATENTS

| | | | |
|---|---|---|---|
| 2,664,044 | 12/1953 | Dalton | 427/121 |
| 2,876,060 | 3/1959 | Chambers | 346/74 SB |
| 2,940,941 | 6/1960 | Dalton | 346/74 SB |
| 3,411,948 | 11/1968 | Reis | 346/74 SB |
| 3,511,700 | 5/1970 | Miro | 428/209 |
| 3,789,425 | 1/1974 | Matsushima | 346/74 SB |
| 3,920,873 | 11/1975 | Diamond | 428/195 |

*Primary Examiner*—Ralph S. Kendall
*Assistant Examiner*—John D. Smith
*Attorney, Agent, or Firm*—Gerald J. Ferguson, Jr.; Joseph J. Baker

[57] ABSTRACT

A recording medium having a recoding layer, a conductive layer and a base body is disclosed which is provided with a conductive electrode on a portion of the surface of recording layer in such a manner as not to be in direct contact with the conductive layer.

8 Claims, 6 Drawing Figures

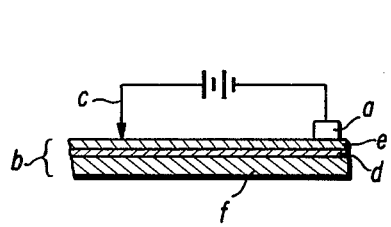
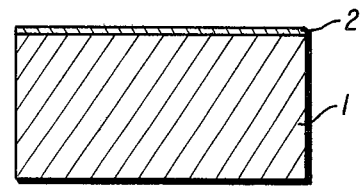
FIG. 1 PRIOR ART
FIG. 2
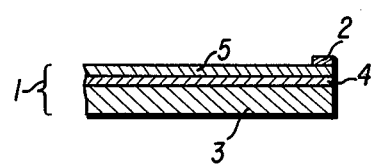
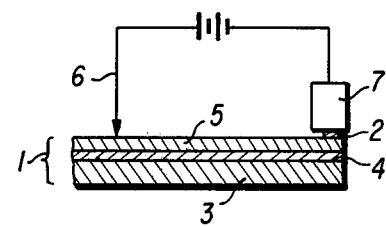
FIG. 3
FIG. 4
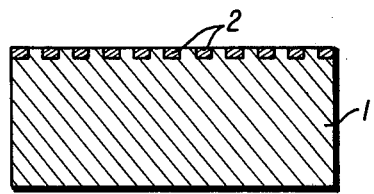
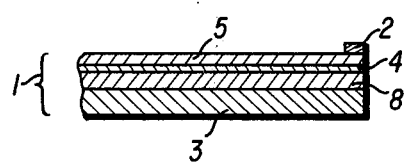
FIG. 5
FIG. 6

RECORDING MEDIUM CONDUCTIVE ELECTRODE

BACKGROUND OF THE INVENTION

The present invention relates to an improvement in a recording medium adapted for use in facsimile or measurement.

Among the conventional recording media for use in facsimile or the like, there are known electrolytic recording medium, electrostatic recording medium and electric discharge recording medium consisting of a colored insulator layer formed on a paper base and a metallic conductive layer provided thereon by evaporation and further an uppermost white surface layer. In the electric discharge recording medium obtained by coating a dark-colored carbon or other conductive material on a base such as paper with a binder and further forming a white surface layer theron, there exists a demerit that the user is discomforted because of odor, smoke or cinder produced during the use. In the electrolytic recording medium having an evaporation conductive layer of aluminum or other metal on a paper base and an electrolytic coloring layer formed thereon, though the above demerit of the electric discharge recording medium is eliminated, there is also a disadvantage that, due to the use of a low-resistance conductive layer of extremely thin aluminum ranging from 500 to 1,000 angstroms, breakdown of the conductive layer may be caused by heat resulting from discharge or similar phenomenon in case a great recording current flow occurs. That is, when such electrolytic recording medium is employed in a device shown in FIG. 1, since the contract between a return electrode (a) and a recording medium (b) is effected by point contact, there arises no problem if the total point-contact area is sufficiently larger than the contact area of a recording stylus (c). Practically, however, the area is not so large. For this reason, in a recording mode, the current density at the point-contact portion immediately below the return electrode (a) becomes high to bring about breakdown of both the conductive layer (d) and the surface recording layer (e) and, in the worst case, burning damage of the paper base (f), thereby causing locally uneven shade or incomplete recording.

SUMMARY OF THE INVENTION

The present invention has been accomplished in an attempt to eliminate such disadvantage, and a primary object of the present invention is to provide an improved recording medium with a conductive electrode which is free from breakdown or burning damage of the conductive layer or surface recording layer thereof even by a great recording current flowing in a return electrode. This object is achieved by forming a conductive electrode on a portion of the surface of an electric discharge recording medium or electrolytic recording medium. Other objects and features of the present invention will become apparent from reading the description of preferred embodiment of the present invention with reference to the accompanying drawings.

BRIEF DESCRIPTION OF THE DRAWING

FIG. 1 illustrates a recording state by use of a conventional recording medium and was explained already.

FIG. 2 is a top view of an exemplary recording medium embodying the present invention.

FIG. 3 is a sectional view of the recording medium shown in FIG. 2.

FIG. 4 illustrates a recording state by the use of the present invention, and

FIGS. 5 and 6 show other examples.

DETAILED DESCRIPTION OF THE PREFERRED EMBODIMENT

Returning to FIG. 2 a top view of an embodiment of the present invention, which is provided with a conductive electrode 2 provided on a surface portion of the base body 1 of a recording medium, the body 1 being practically consisted of a base 3 of paper or the like, a conductive layer 4 such as aluminum evaporation layer covering the entire surface of the base 3 and a surface recording layer 5. The conductive electrode 2 is formed on a portion of the surface recording layer 5 by means of printing, coating or brush painting. The conductive electrodes 2 may be formed at intervals as illustrated in FIG. 5.

When the electrolytic recording medium having such a conductive electrode on a portion of the surface recording layer 5 is used in a general facsimile equipment in the manner shown in FIG. 4, a picture signal applied to a recording stylus 6 flows as a picture current from the recording stylus 6 into a conductive layer 4 by way of the surface recording layer 5. At this time, a large high-density current flows in the surface recording layer 5 to develop color, and simultaneously the current having flowed into the conductive layer 4 is dispersed in this layer to lower its current density and further flows toward a conductve electrode 2, which serves to feed the current back to a return electrode 7. In this case, though the conductive electrode 2 is in point-contact with the return electrode 7, the electric potential of the surface recording layer 5 remains equal to that of the return electrode 7 due to an extremely low electric resistance of the conductive electrode 2. Moreover, since the conductive electrode 2 and the surface recording layer 5 are electrically in uniform contact, the picture current flowing in the conductive layer 4 is dispersed and the current density between the conductive layer 4 and the surface recording layer 5 is low, thereby preventing the breakdown or burning damage of each layer resulting from generation of heat. The description given above on the electrolytic recording medium is of course applicable also to an electric discharge recording medium such as shown in FIG. 6, merely with a change that discharge breakdown is replaced by an electrolytic coloring layer 8.

The conductive electrode 2 may be opaque because it is formed on a non-recording portion of the surface of that body 1 by the application of conductive coating material or evaporation of metal, but in view of appearance, transparency is desirable. By selectively setting the electric resistance of the conductive electrode 2 to a desired value, it is rendered possible to transfer the recording voltage-to-current characteristic to high-voltage side, thereby attaining improved matching to the facsimile equipment.

According to the present invention, as described in detail herinabove, a conductive electrode is provided on a surface portion of the base body of a recording medium having an inner conductive layer, in such a manner as not to be in direct contact with the conductive layer, so that a picture current fed back to a return electrode via the conductive layer is dispersed due to the existance of the conductive electrode when passing through the surface recording layer. Therefore, in spite of point contact between the return electrode and the conductive electrode, it becomes possible to achieve complete prevention of faults such as breakdown of the surface recording layer or burning damage of the conductive layer and base. Moreover, since the above-mentioned conductive electrode can be easily formed on the surface of the base body, manufacture of a relatively low-cost recording medium is rendered possible, and the mere provision of such a conductive electrode on the existing recording medium produces an improved one that is hardly broken even by a large-current picture signal.

It is believed that the features of the above-described recording medium will be apparent from the foregoing description. While the medium has been described as being suitable for facsimile system or the like, the application is not limited thereby as will be obvious for those skilled in the art. Further, the various requirements of the present medium may be modified or changed in various manners without departing the spirit of the present invention, as defined in the annexed claims.

What is claimed is:

1. A recording medium comprising a base body of insulating material, an electrically conductive layer disposed on said base body, a recording layer disposed on said electrically conductive layer and an electrode means non-removably, fixedly disposed on only a portion of said recording layer, said electrode means uniformly contacting said recording layer over a planar area so that the current density between the electrically conductive layer and the surface recording layer is low thereby preventing damage of said last two-mentioned layers due to the generation of heat.

2. A recording medium as set forth in claim 1, wherein said electrode means comprises an elongated strip of electrically conductive material disposed on and extending along an edge portion of said recording layer.

3. A recording medium as set forth in claim 1, wherein said electrode means comprises as plurality of segments disposed on and along an edge portion of said recording layer at intervals.

4. A recording medium as set forth in claim 1, further comprising an electrolytic coloring layer disposed between said base body and said electrically conductive layer.

5. A recording medium as set forth in claim 4, wherein said electrode means comprises an elongated strip disposed on and extending along an edge portion of said recording layer.

6. A recording medium as set forth in claim 4, wherein said electrode means comprises a plurality of segments disposed on and along an edge portion of said recording layer at intervals.

7. A recording medium as set forth in claim 1, wherein said electrode means is of transparent material.

8. Recording apparatus comprising
   a recording medium including a base body of insulating material, an electrically conductive layer disposed on said base body, a recording layer disposed on said electrically conductive layer and an electrode means non-removably, fixedly disposed on only a portion of said recording layer, said electrode means uniformly contacting said recording layer over a planar area so that the current density between the electrically conductive layer and the surface recording layer is low thereby preventing damage of said last two-mentioned layers due to the generation of heat.
   means for generating an electrical image signal,
   a recording stylus in contact with said recording layer and responsive to the image signal generating means for applying said image signal to the recording layer, said signal being conducted through said recording layer to record an image thereon and then dispersed in said electrically conductive layer,
   a return electrode connected to said image signal generating means in contact with said electrode means so that the signal in said electrically conductive layer is returned to said image signal generating means via said recording layer.

* * * * *